(12) United States Patent
Lee et al.

(10) Patent No.: US 8,861,180 B2
(45) Date of Patent: Oct. 14, 2014

(54) MULTILAYER CERAMIC ELECTRONIC COMPONENT

(71) Applicant: Samsung Electro-Mechanics Co., Ltd., Gyunggi-do (KR)

(72) Inventors: Chang Ho Lee, Gyunggi-do (KR); Dong Hwan Seo, Gyunggi-do (KR); Sang Hyun Park, Gyunggi-do (KR)

(73) Assignee: Samsung Electro-Mechanics Co., Ltd., Suwon-si, Gyunggi-do (KR)

( * ) Notice: Subject to any disclaimer, the term of this patent is extended or adjusted under 35 U.S.C. 154(b) by 80 days.

(21) Appl. No.: 13/745,064

(22) Filed: Jan. 18, 2013

(65) Prior Publication Data

US 2013/0242456 A1 Sep. 19, 2013

(30) Foreign Application Priority Data

Mar. 13, 2012 (KR) .......................... 10-2012-0025747

(51) Int. Cl.
| | |
|---|---|
| *H01G 4/06* | (2006.01) |
| *H01G 4/008* | (2006.01) |
| *H01G 4/30* | (2006.01) |
| *H01G 4/232* | (2006.01) |
| *H01G 4/12* | (2006.01) |

(52) U.S. Cl.
CPC ................ *H01G 4/008* (2013.01); *H01G 4/30* (2013.01); *H01G 4/232* (2013.01); *H01G 4/12* (2013.01)
USPC .................. 361/321.2; 361/301.2; 361/301.4; 361/306.1; 361/306.3; 361/321.1

(58) Field of Classification Search
USPC .......... 361/321.2, 301.2, 301.4, 306.1, 306.3, 361/303–305, 311–313, 308.1
See application file for complete search history.

(56) References Cited

U.S. PATENT DOCUMENTS

| | | | | |
|---|---|---|---|---|
| 5,805,409 | A * | 9/1998 | Takahara et al. .............. | 361/303 |
| 6,002,577 | A * | 12/1999 | Wada et al. .................... | 361/312 |
| 6,310,757 | B1 * | 10/2001 | Tuzuki et al. .............. | 361/308.1 |
| 6,381,118 | B1 * | 4/2002 | Yokoyama et al. ........ | 361/308.1 |
| 7,505,249 | B2 * | 3/2009 | Komatsu et al. ........... | 361/321.1 |
| 7,859,822 | B2 * | 12/2010 | Nakano et al. ................ | 361/311 |

FOREIGN PATENT DOCUMENTS

| | | |
|---|---|---|
| JP | 8-107039 A | 4/1996 |
| JP | 2003-022929 A | 1/2003 |
| JP | 2007-067239 A | 3/2007 |

* cited by examiner

*Primary Examiner* — Nguyen T Ha

(74) *Attorney, Agent, or Firm* — McDermott Will & Emery LLP

(57) ABSTRACT

A multilayer ceramic electronic component includes a ceramic main body having internal electrodes laminated therein; and external electrodes formed on ends of the ceramic main body in a length direction, wherein each external electrode includes a first layer formed on the ceramic main body and including a conductive metal, and a second layer formed on the first layer and including a conductive resin, and when Tc is thickness of a cover layer, Te is thickness of the internal electrode, Td is distance between neighboring internal electrodes, L1 is length from either end of the ceramic main body in the length direction in a region in which the cover layer adjoins a margin part of the ceramic main body to an end of the first layer formed on an upper or lower surface of the ceramic main body, and Lm is length of the margin part, $Tc \leq 70$ μm and $L1 < Lm + Tc \times \cot 50°$ are satisfied.

9 Claims, 2 Drawing Sheets

X-X`

X-X'

MULTILAYER CERAMIC ELECTRONIC COMPONENT

CROSS-REFERENCE TO RELATED APPLICATIONS

This application claims the priority of Korean Patent Application No. 10-2012-0025747 filed on Mar. 13, 2012, in the Korean Intellectual Property Office, the disclosure of which is incorporated herein by reference.

BACKGROUND OF THE INVENTION

1. Field of the Invention

The present invention relates to a multilayer ceramic electronic component, and more particularly to a multilayer ceramic electronic component having excellent reliability.

2. Description of the Related Art

In electronic components for use in industrial electronic devices, defects such as warpage, cracks, and the like, may cause lack of functionality therein, and thus, reliability is important. In order to prevent the occurrence of cracks, a technique of forming a portion of an external electrode with a conductive resin layer has been introduced.

However, even in the case in which a portion of the external electrode is formed of the conductive resin layer, a cover layer needs to be thinner, as products tend to have ever-higher capacitances. The thinner cover layer may lead to the possibility of cracks occurring in electronic components when a substrate warps after the mounting of the electronic components on the substrate.

In the area of electronic components for use in industrial electronic devices, in which product reliability is considered important, even in the case in which cracks occur due to substrate warping, it is necessary to prevent cracks from negatively affecting electronic component performance.

RELATED ART DOCUMENTS (Patent Document 1) Japanese Patent Laid-Open Publication No. 2007-067239
(Patent Document 2) Japanese Patent Laid-Open Publication No. 1996-107039

SUMMARY OF THE INVENTION

An aspect of the present invention provides a multilayer ceramic electronic component having excellent reliability.

According to an aspect of the present invention, there is provided a multilayer ceramic electronic component, including: a ceramic main body having internal electrodes laminated therein; and external electrodes formed on both ends of the ceramic main body in a length direction thereof, wherein each of the external electrodes includes a first layer formed on the ceramic main body and including a conductive metal, and a second layer formed on the first layer and including a conductive resin, and when Tc is a thickness of a cover layer of the ceramic main body, Te is a thickness of the internal electrode, Td is a distance between neighboring internal electrodes, L1 is a length from either end of the ceramic main body in the length direction thereof in a region in which the cover layer of the ceramic main body adjoins a margin part of the ceramic main body in the length direction thereof to an end of the first layer formed on an upper surface or a lower surface of the ceramic main body, and Lm is a length of the margin part of the ceramic main body, $Tc \leq 70$ μm and $L1 < Lm + Tc \times \cot 50°$ are satisfied.

The multilayer ceramic electronic component may be 1005-sized or greater.

The conductive metal may include at least one selected from the group consisting of gold, silver, palladium, copper, nickel, and alloys thereof.

The conductive resin may include at least one selected from the group consisting of a silver (Ag)-epoxy resin, a copper (Cu)-epoxy resin, and a copper (Cu)-coated silver (Ag) resin.

According to an aspect of the present invention, there is provided a multilayer ceramic electronic component, including: a ceramic main body having internal electrodes alternately laminated therein; and external electrodes formed on both ends of the ceramic main body in a length direction thereof, wherein each of the external electrodes includes a first layer formed on the ceramic main body and including a conductive metal, and a second layer formed on the first layer and including a conductive resin, and when Tc is a thickness of a cover layer of the ceramic main body, Te is a thickness of the internal electrode, Td is a distance between neighboring internal electrodes, L2 is a length from either end of the ceramic main body in the length direction thereof in a region in which the cover layer of the ceramic main body adjoins the internal electrode to an end of the first layer formed on an upper surface or a lower surface of the ceramic main body, and Lm is a length of a margin part of the ceramic main body, $Tc \leq 70$ μm and $L2 < Lm + (Tc + Te + Td) \times \cot 50°$ are satisfied.

When L1 is a length from either end of the ceramic main body in the length direction thereof in a region in which the cover layer of the ceramic main body adjoins the margin part of the ceramic main body in the length direction thereof to the end of the first layer formed on the upper surface or the lower surface of the ceramic main body, $L1 < Lm + Tc \times \cot 50°$ may be satisfied.

The multilayer ceramic electronic component may be 1005-sized or greater.

The conductive metal may include at least one selected from the group consisting of gold, silver, palladium, copper, nickel, and alloys thereof.

The conductive resin may include at least one selected from the group consisting of a silver (Ag)-epoxy resin, a copper (Cu)-epoxy resin, and a copper (Cu)-coated silver (Ag) resin.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Figure 1:
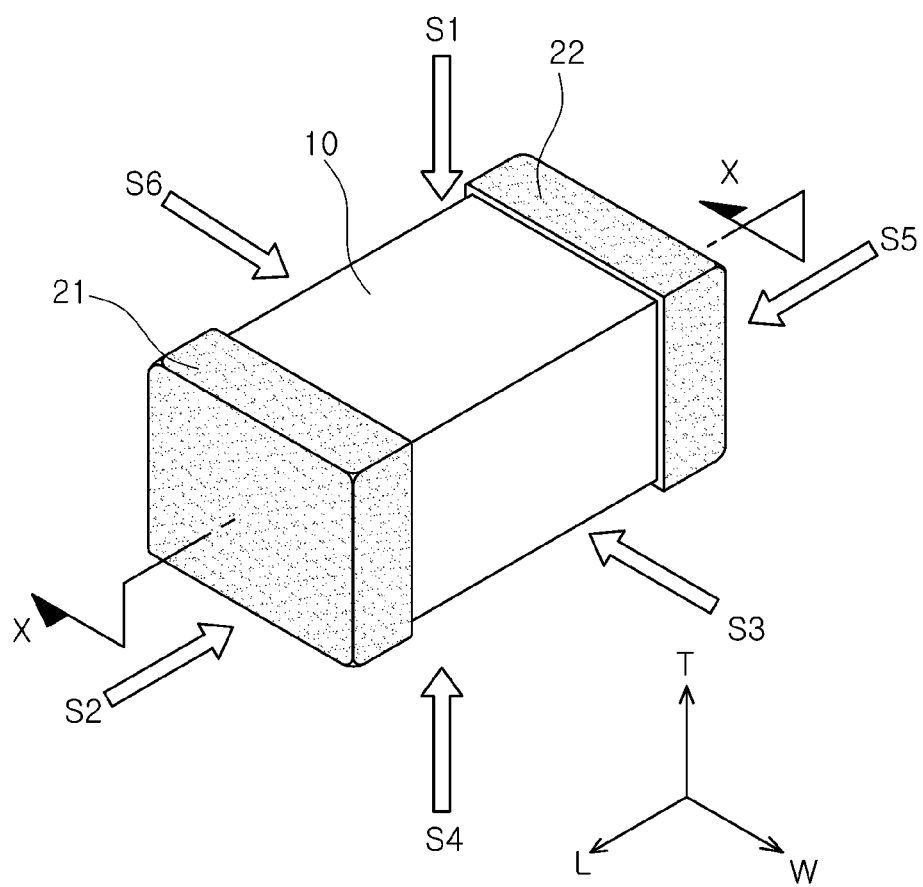
FIG. 1 is a perspective view of a multilayer ceramic electronic component according to an embodiment of the present invention.

Embodiments of the present invention will now be described in detail with reference to the accompanying drawings.

The invention may, however, be embodied in many different forms and should not be construed as being limited to the embodiments set forth herein.

Rather, these embodiments are provided so that this disclosure will be thorough and complete, and will fully convey the scope of the invention to those skilled in the art.

In the drawings, the shapes and dimensions of elements may be exaggerated for clarity, and the same reference numerals will be used throughout to designate the same or like elements.

Figure 2:
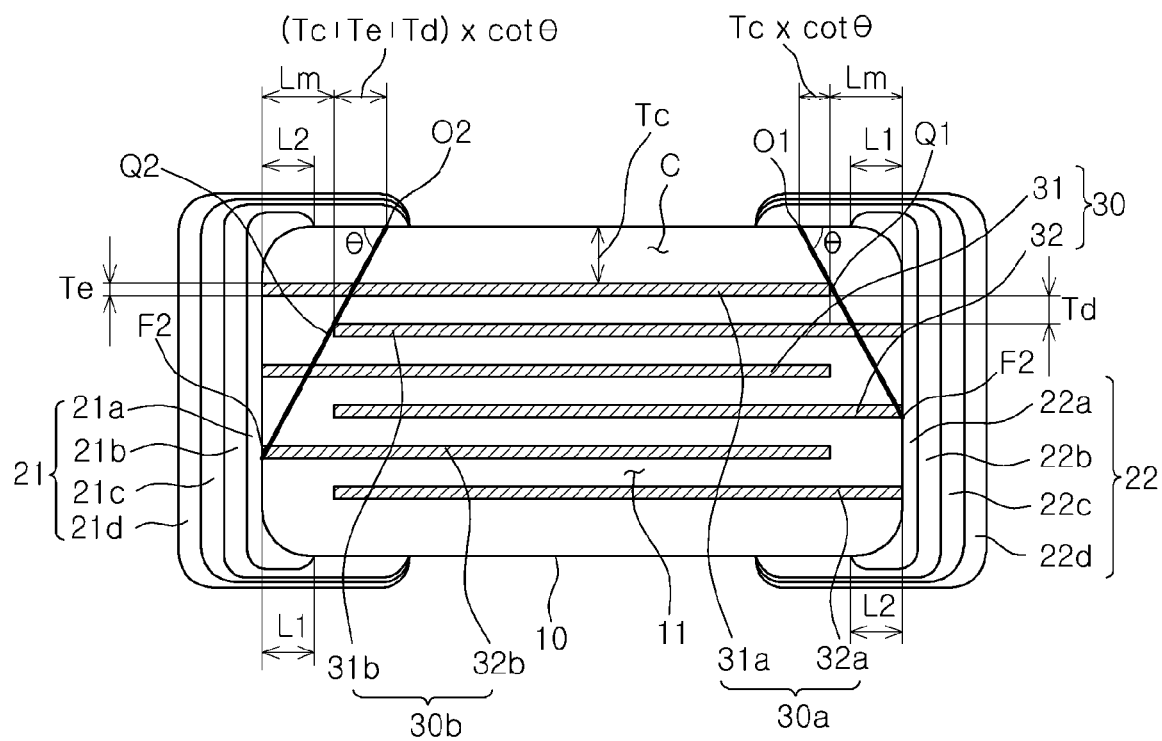
FIG. 2 is a cross-sectional view taken along line X-X' of FIG. 1.

FIG. 1 is a perspective view of a multilayer ceramic electronic component according to an embodiment of the present invention. FIG. 2 is a cross-sectional view taken along line X-X' of FIG. 1.

Referring to FIGS. 1 and 2, a multilayer ceramic electronic component according to an embodiment of the present invention may include a ceramic main body 10, internal electrodes 30 laminated on the inside of the ceramic main body 10, and external electrodes 21 and 22 formed on the outside of the ceramic main body 10.

The ceramic main body 10 may have a parallelpiped shape. The terms, "length direction", "width direction", and "thickness direction" may be designated by "L direction", "W direction", and "T direction" in FIG. 1, respectively. Here, the thickness direction may refer to a direction in which the internal electrodes are laminated.

As for the ceramic main body 10, the length thereof is larger than the width thereof and the thickness thereof may be equal to the width thereof. The ceramic main body 10 may have an upper surface S1, a lower surface S4, side surfaces S3 and S6, and end surfaces S2 and S5.

The ceramic main body 10 may include a dielectric material having a high dielectric constant, and may specifically include barium titanate or strontium titanate, without being limited thereto.

Since the dielectric material is electrically dipolar, it may store a larger electrical charge.

An area from the upper surface S1 to the uppermost internal electrode 31a in the ceramic main body 10 may be designated as a cover layer C. Also, an area from the lower surface S4 to the lowermost internal electrode 32a in the ceramic main body 10 may be also designated as a cover layer C.

The internal electrodes 30 may be laminated and spaced apart from each other inside the ceramic main body 10. Adjacent internal electrodes 31 and 32 may be withdrawn in opposing directions, and electric currents having opposing polarities may be applied thereto.

The internal electrode 30 may include at least one selected from the group consisting of gold, silver, copper, nickel, palladium, platinum, and alloys thereof, but is not limited thereto. Any material may be used therefor without particular limitation so long as it can impart conductivity to the internal electrode 30.

Gold, silver, palladium, platinum, and the like are noble metals and are thus relatively expensive, but chemically stable. Nickel, copper, and the like are base metals, and are thus relatively cheap. However, since they are easily oxidizable during a sintering procedure, a reducing atmosphere may be necessary for the sintering procedure.

The external electrodes may be formed on both ends of the ceramic main body 10 in a length direction ("L direction") thereof, and may include first and second external electrodes 21 and 22. Electric currents having opposite polarities may be applied to the first and second external electrodes 21 and 22. The first external electrode 21 may include first and second layers 21a and 21b, and the second external electrode 22 may include first and second layers 22a and 22b.

The first layers 21a and 22a may be formed on the ceramic main body 10, and may be formed of metal.

The first layers 21a and 22a may be directly connected to the internal electrodes 31 and 32. A metal constituting the first layers 21a and 22a and a metal constituting the internal electrodes 31 and 32 may form an alloy at connection portions therebetween. Hereby, the external electrodes 21 and 22 may be strongly connected to the internal electrodes 31 and 32.

The first layers 21a and 22a may be formed by using a conductive paste including conductive metals and glass frit, but are not limited thereto. Here, the conductive metal may include at least one selected from the group consisting of gold, silver, palladium, copper, nickel, and alloys thereof.

However, since the first layers 21a and 22a are formed of metal or glass, the first layers 21a and 22a are vulnerable to external impacts. Since metal and glass have a low degree of toughness, the external electrodes 21 and 22 may be disconnected from the internal electrodes 31 and 32 due to external impacts.

The second layers 21b and 22b may be formed on the first layers 21a and 22a, respectively, and may include a conductive resin.

The conductive resin may include at least one selected from the group consisting of a silver (Ag)-epoxy resin, a copper (Cu)-epoxy resin, and a copper (Cu)-coated silver (Ag) resin. That is, the conductive resin may be prepared by using a paste including an epoxy resin and at least one selected from the group consisting of silver (Ag) powder, copper (Cu) powder, and copper (Cu)-coated silver (Ag) powder.

The silver (Ag) powder or the copper (Cu) powder may impart conductivity to the second layers 21b and 22b. Any material may be used therefor without particular limitation so long as it can impart conductivity to the second layers 21b and 22b.

The epoxy resin may impart elasticity to the second layers 21b and 22b. The epoxy resin may absorb external impacts applied thereto, and thus, impact resistance thereof may be improved.

The first external electrode 21 may include first and second plating layers 21c and 21d, and the second external electrode 22 may include first and second plating layers 22c and 22d. The first plating layers 21c and 22c and the second plating layers 21d and 22d may be formed for ease of mountability.

The first plating layers 21c and 22c may be formed on the second layers 21b and 22b, respectively, and the second plating layers 21d and 22d may be formed on the first plating layers 21c and 22c, respectively. The first plating layers 21c and 22c may be nickel plating layers, and the second plating layers 21d and 22d may be tin plating layers.

Hereinafter, a situation in which cracks occur in portions of the ceramic main body in which the internal electrodes are connected to the external electrodes will mainly be described.

According to the present embodiment, even in the case in which cracks occur in the connection portions of the internal and external electrodes of the ceramic main body, product performance may not be affected thereby.

In the present embodiment, each cover layer C of the ceramic main body 10 may have a thickness Tc of 70 μm or less.

The thickness Tc of the cover layer C may be an average value obtained by measuring thicknesses at 10 equidistant points on the cover layer C, extracted from an image obtained by scanning a cross section of a central portion of the ceramic main body 10 taken in the length and thickness directions thereof with a scanning electron microscope, and then averaging the measured thicknesses.

The central portion of the ceramic main body 10 may be equivalent to a region within 45% of the total width of the ceramic main body 10 in both directions outwardly of the center of the ceramic main body 10 in the width direction (W direction) thereof. The thickness Tc of the cover layer may have a stable value within the above range.

When Tc exceeds 70 μm, warping and cracks do not occur, since the cover layer C is relatively thick. As the multilayer ceramic electronic component is highly laminated and thus has increased capacitance, the thickness Tc of the cover layer may be reduced to 70 μm or less, which may cause warping and cracks.

The embodiment of the present invention is provided to solve cracks occurring when the thickness Tc of the cover layer is 70 μm or less and defects occurring due to the cracks.

In the present embodiment, $L1 < Lm + Tc \times \cot 50°$ may be satisfied.

That is, a length L1 from either end of the ceramic main body 10 in the length direction thereof in a region in which the cover layer C of the ceramic main body 10 adjoins a margin part of the ceramic main body 10 in the length direction thereof to an end of each of the first layers 21a and 22a formed on the upper surface S1 or the lower surface S4 of the ceramic main body 10 may be smaller than a value obtained by adding a length Lm of the margin part of the ceramic main body to the product of the thickness Tc of the cover layer C of the ceramic main body 10 and cot 50°.

This takes into consideration the relationship between the outermost internal electrodes, that is, the uppermost and lowermost internal electrodes 31a and 32a and the cracks.

The occurrence of cracks may be prevented or reduced by forming the second layers 21b and 22b made of a conductive resin in the external electrodes. If $L1 \leq Lm + Tc \times \cot 50°$, short circuits may not occur even in the case that cracks occur, and thus product performance may not be affected thereby. This fail safe mode may be particularly required in industrial electronic devices requiring reliability.

Cracks may occur at the end of the first layer 21a of the external electrode made of metal. This is due to the fact that stress is concentrated on the end of the first layer 21a since the first layer 21a is made of metal such that the first layer 21a has a high level of hardness and a low capability to absorb impacts. The crack may start from the end of the first layer, proceed inside the ceramic main body 10, and terminate at an interface F2 with the first layer.

FIG. 2 shows the case in which cracks have occurred, exaggerating the case in which short circuits may occur regardless of crack occurrence starting points. Therefore, the crack occurrence starting points O1 and O2 do not correspond to the ends of the first layers.

The cracks may be formed in an almost linear manner, and may make a predetermined angle θ with respect to the upper surface S1 of the ceramic main body 10. The angle of the crack with respect to the upper surface S1 of the ceramic main body 10 may be designated by a crack angle. Here, the crack angle may be about 50°.

Referring to a crack Q1 of FIG. 2, the crack Q1 intersects the uppermost internal electrode 31a. Since the first and second internal electrodes 31 and 32 to which electric currents having opposite polarities are applied are connected through the crack Q1, short circuits may occur.

L1 needs to be smaller than $Lm + Tc \times \cot(50°)$ so that the crack does not intersect the uppermost internal electrode 31a even in the case that the crack occurs, and thus short circuits may not occur.

If $L1 \leq Lm + Tc \times \cot(50°)$, the crack Q1 intersects or penetrates the uppermost internal electrode 31a, and crosses a penultimate upper internal electrode 31b, and thus, short circuits may occur due to the crack Q1.

In another embodiment of the present invention, $L2 < Lm + (Tc + Te + Td) \times \cot 50°$ may be satisfied.

That is, a length L2 from either end of the ceramic main body 10 in the length direction thereof in a region in which the cover layer C of the ceramic main body 10 adjoins the uppermost or lowermost internal electrode 31a or 32a to an end of each of the first layers 21a and 22a formed on the upper surface S1 or the lower surface S4 of the ceramic main body 10 may be smaller than a value obtained by multiplying the sum of the thickness Tc of the cover layer C of the ceramic main body 10, a thickness Te of the internal electrode and a distance Td between neighboring internal electrodes by cot 50° and adding the length Lm of the margin part of the ceramic main body 10 thereto.

This takes into consideration the relationship between the penultimate upper and lower internal electrodes 31b and 32b and a crack Q2. The penultimate upper and lower internal electrodes 31b and 32b may refer to internal electrodes neighboring the uppermost and lowermost internal electrodes 31a and 32a, respectively.

Since electric currents having opposite polarities to those applied to the uppermost and lowermost internal electrodes 31a and 32a are applied to the penultimate upper and lower internal electrodes 31b and 32b, short circuits may occur in the case in which the uppermost and lowermost internal electrodes 31a and 32a are respectively connected to the penultimate upper and lower internal electrodes 31b and 32b via cracks.

Referring to the crack Q2 of FIG. 2, the crack Q2 may have a predetermined angle θ, generally 50°. If L2 is greater than $Lm + (Tc + Te + Td) \times \cot 50°$, the crack Q2 penetrating the uppermost internal electrode 31a intersects or penetrates the penultimate upper internal electrode 31b, and thus short circuits may occur due to the crack Q2.

L2 needs to be smaller than $Lm + (Tc + Te + Td) \times \cot 50°$ so that the crack Q2, penetrating the uppermost internal electrode 31a, does not intersect the penultimate upper internal electrode 31b, and thus short circuits may not occur.

The thickness Tc of the cover layer of the ceramic main body, the thickness Te of the internal electrode, and the distance Td between the internal electrodes may be average values.

They may each be an average value obtained by measuring values at 10 equidistant points on the image obtained by scanning the cross section of the central portion of the ceramic main body taken in the length and thickness directions using a scanning electron microscope, and then averaging the measured values.

The central portion of the ceramic main body 10 may be equivalent to a region within 45% of the total width of the ceramic main body 10 in both directions outwardly of the center of the ceramic main body 10 in the width direction (W direction) thereof. The thickness Tc of the cover layer of the ceramic main body, the thickness Te of the internal electrode, and the distance Td between the internal electrodes may have stable values within the above range.

In the present embodiment, the multilayer ceramic electronic component may be 1005-sized or greater.

1005 size may be defined as $(1.0 \pm 0.15 \text{ mm}) \times (0.5 \pm 0.05 \text{ mm})$.

Hereinafter, the present invention will be described in detail, with reference to inventive examples and comparative examples.

A multilayer ceramic capacitor according to each inventive example was manufactured as follows.

A barium titanate powder, ethanol as an organic solvent, and polyvinylbutyral as a binder were mixed, followed by ball milling, thereby preparing a ceramic slurry. Ceramic green sheets were produced by using the ceramic slurry.

A conductive paste for an internal electrode containing nickel was printed on the ceramic green sheets, to form internal electrodes thereon. The resultant sheets were laminated to produce a green laminate, and the green laminate was then subjected to isostatic pressing with a pressure of 1,000 kgf/cm² at 85° C.

The compressed green laminate was cut into green chips, and the cut green chips were then subjected to a debindering process in which they were maintained at a temperature of 230° C. under an air atmosphere for 60 hours. The green chip was sintered at 950° C., to produce a sintered chip. The sintering process was performed under a reducing atmosphere to prevent oxidation of the internal electrodes. The reducing atmosphere was set to $10^{-11}$-$10^{-10}$ atm, lower than the Ni/NiO equilibrium oxygen partial pressure.

First layers were formed on outer surfaces of the sintered chip by using a first paste including a copper powder and a glass powder.

Second layers formed of a conductive resin were formed to cover the first layers, respectively, by using a second paste. A paste containing epoxy, silver (Ag), and a hardening agent was used as the second paste, and then the second layers were cured by applying heat thereto.

Nickel and tin plating layers were sequentially formed on each of the second layers, respectively, through electroplating.

First, in order to investigate whether or not cracks occur as the thickness of a cover layer is decreased, a multilayer ceramic capacitor sample in which the thickness of the cover layer was varied was manufactured. The sample was mounted on a substrate, and then a warpage test was performed thereupon. After the test, a cross section of the sample was inspected with a high-resolution microscope to confirm the occurrence or non-occurrence of cracks.

In the warpage test, it was determined whether or not the sample was defective or not according to the change in capacitance by mounting the sample on the substrate and applying weight to a rear surface of the substrate on which the sample was mounted for 5 seconds.

The substrate was pressed to be deformed by 3 mm for Class 1 and 2 mm for Class 2, and the reference for determining warping strength was set as a range of ±10% of an initial capacitance value.

TABLE 1

| | Tc (μm) | Lm (μm) | L1 (μm) | Lm + Tc × cot50° | Number of Cracks |
|---|---|---|---|---|---|
| 1 | 85 | 80 | 160 | 151 | 0/100 |
| 2 | 80 | 80 | 150 | 147 | 0/100 |
| 3 | 75 | 80 | 150 | 142 | 0/100 |
| 4 | 70 | 80 | 150 | 139 | 70/100 |
| 5 | 65 | 80 | 150 | 134 | 75/100 |
| 6 | 60 | 80 | 150 | 130 | 82/100 |

Referring to Table 1, it can be confirmed that cracks occurred as the thickness of the cover layer was reduced to 70 μm or less. The object of the present invention is to solve the problem of cracks occurring as the thickness of the cover layer is reduced to 70 μm or less.

Next, in order to confirm whether short circuits occur in consideration of the relationship between the crack and the uppermost internal electrode, Tc was set to 65 μm and L1 was varied. The warpage test results are shown in Table 2.

Specifically, the samples in which short circuits occurred were individually separated, and then cross sections thereof were observed. Then, the samples in which the crack occurred in the region of the ceramic main body in the vicinity of either end of the uppermost internal electrode were selected and then the average values thereof were measured.

TABLE 2

| | Tc (μm) | Lm (μm) | L1 (μm) | Lm + Tc × cot50° | Occurrence or Non-occurrence of Short Circuit |
|---|---|---|---|---|---|
| Comparative Example 1 | 65 | 80 | 160 | 138 | Occurrence |
| Comparative Example 2 | | 80 | 150 | 138 | Occurrence |
| Comparative Example 3 | | 80 | 140 | 138 | Occurrence |
| Inventive Example 1 | | 80 | 130 | 138 | Non-occurrence |
| Inventive Example 2 | | 80 | 120 | 138 | Non-occurrence |

Referring to Table 2, L1 in Comparative Examples 1 to 3 was 160 μm, 150 μm, and 140 μm, respectively, greater than Lm+Tc×cot 50°, whereby short circuits occurred.

L1 in Inventive Examples 1 and 2 was 130 μm and 120 μm, respectively, smaller than Lm+Tc×cot 50°, whereby short circuits did not occur.

As a result, it can be confirmed that the short circuits occurred when L1 was greater than Lm+Tc×cot 50°, and the short circuits did not occur when L1 was smaller than Lm+Tc×cot 50°. The reason is that the short circuits occur when the crack intersects or penetrates the uppermost internal electrode and thus, the uppermost internal electrode is connected to the penultimate upper internal electrode by the crack.

Next, in order to confirm whether short circuits occur in consideration of the relationship between the crack and the penultimate upper internal electrode, Tc was set to 65 μM and L2 was varied. The warpage test results are shown in Table 3.

Specifically, the samples in which short circuits occurred were individually separated, and then cross sections thereof were observed. Then, the samples in which the crack occurred in the region of the ceramic main body in the vicinity of either end of the penultimate upper internal electrode were selected and then the average values thereof were measured.

TABLE 3

| | Tc (μm) | Lm (μm) | L2 (μm) | Lm + (Tc + Te + Td) × cot50° | Occurrence or Non-occurrence of Short Circuit |
|---|---|---|---|---|---|
| Comparative Example 4 | 65 | 80 | 160 | 148 | Occurrence |
| Comparative Example 5 | | 80 | 150 | 148 | Occurrence |
| Inventive Example 3 | | 80 | 140 | 148 | Non-occurrence |
| Inventive Example 4 | | 80 | 130 | 148 | Non-occurrence |
| Inventive Example 5 | | 80 | 120 | 148 | Non-occurrence |

Referring to FIG. 3, L2 in Comparative Examples 4 and was 160 μm and 150 μm, respectively, greater than Lm+(Tc+Te+Td)×cot 50°, whereby short circuits occurred.

L2 in Inventive Examples 3 and 5 was 140 μm, 130 μm, and 120 μm, respectively, smaller than Lm+(Tc+Te+Td)×cot 50°, short circuits did not occur.

As a result, it can be confirmed that the short circuits occurred when L2 was greater than $Lm+(Tc+Te+Td) \times \cot 50°$, and the short circuits did not occur when L2 was smaller than $Lm+(Tc+Te+Td) \times \cot 50°$. The reason is that the short circuits occur when the crack penetrates the uppermost internal electrode and then intersects or penetrates the penultimate upper internal electrode.

As set forth above, according to embodiments of the present invention, the occurrence of warpage and cracks can be lowered by introducing a conductive resin layer. Further, even in the case that the warpage and cracks occur, a predetermined capacitance value can be realized by preventing cracks from passing through internal electrodes. Hereby, a multilayer ceramic electronic component having excellent reliability can be realized.

While the present invention has been shown and described in connection with the embodiments, it will be apparent to those skilled in the art that modifications and variations can be made without departing from the spirit and scope of the invention as defined by the appended claims.

What is claimed is:

1. A multilayer ceramic electronic component, comprising:
    a ceramic main body having internal electrodes laminated therein; and
    external electrodes formed on both ends of the ceramic main body in a length direction thereof,
    wherein each of the external electrodes includes a first layer formed on the ceramic main body and including a conductive metal, and a second layer formed on the first layer and including a conductive resin, and
    when Tc is a thickness of a cover layer of the ceramic main body, Te is a thickness of the internal electrode, Td is a distance between neighboring internal electrodes, L1 is a length from either end of the ceramic main body in the length direction thereof in a region in which the cover layer of the ceramic main body adjoins a margin part of the ceramic main body in the length direction thereof to an end of the first layer formed on an upper surface or a lower surface of the ceramic main body, and Lm is a length of the margin part of the ceramic main body, $Tc \leq 70$ μm and $L1 < Lm+Tc \times \cot 50°$ are satisfied.

2. The multilayer ceramic electronic component of claim 1, wherein the multilayer ceramic electronic component is 1005-sized or greater.

3. The multilayer ceramic electronic component of claim 1, wherein the conductive metal includes at least one selected from the group consisting of gold, silver, palladium, copper, nickel, and alloys thereof.

4. The multilayer ceramic electronic component of claim 1, wherein the conductive resin includes at least one selected from the group consisting of a silver (Ag)-epoxy resin, a copper (Cu)-epoxy resin, and a copper (Cu)-coated silver (Ag) resin.

5. A multilayer ceramic electronic component, comprising:
    a ceramic main body having internal electrodes alternately laminated therein; and
    external electrodes formed on both ends of the ceramic main body in a length direction thereof,
    wherein each of the external electrodes includes a first layer formed on the ceramic main body and including a conductive metal, and a second layer formed on the first layer and including a conductive resin, and
    when Tc is a thickness of a cover layer of the ceramic main body, Te is a thickness of the internal electrode, Td is a distance between neighboring internal electrodes, L2 is a length from either end of the ceramic main body in the length direction thereof in a region in which the cover layer of the ceramic main body adjoins the internal electrode to an end of the first layer formed on an upper surface or a lower surface of the ceramic main body, and Lm is a length of a margin part of the ceramic main body, $Tc \leq 70$ μm and $L2 < Lm+(Tc+Te+Td) \times \cot 50°$ are satisfied.

6. The multilayer ceramic electronic component of claim 5, wherein, when L1 is a length from either end of the ceramic main body in the length direction thereof in a region in which the cover layer of the ceramic main body adjoins the margin part of the ceramic main body in the length direction thereof to the end of the first layer formed on the upper surface or the lower surface of the ceramic main body, $L1 < Lm+Tc \times \cot 50°$ is satisfied.

7. The multilayer ceramic electronic component of claim 5, wherein the multilayer ceramic electronic component is 1005-sized or greater.

8. The multilayer ceramic electronic component of claim 5, wherein the conductive metal includes at least one selected from the group consisting of gold, silver, palladium, copper, nickel, and alloys thereof.

9. The multilayer ceramic electronic component of claim 5, wherein the conductive resin includes at least one selected from the group consisting of a silver (Ag)-epoxy resin, a copper (Cu)-epoxy resin, and a copper (Cu)-coated silver (Ag) resin.

* * * * *